United States Patent [19]

Watson

[11] 4,051,775

[45] Oct. 4, 1977

[54] APPARATUS FOR AUTOMATICALLY POSITIONING WITH RESPECT TO A PREDETERMINED OPERATION STATION

[76] Inventor: Edward F. Watson, 28 Minton Ave., Chatham, N.J. 07928

[21] Appl. No.: 625,143

[22] Filed: Oct. 23, 1975

[51] Int. Cl.$^2$ .................... B23B 15/00; B41F 17/08
[52] U.S. Cl. ........................... 101/38 A; 214/1 BD; 198/488
[58] Field of Search .............. 214/1 BD, 1 BV, 1 BC, 214/1 BH, 1 PB, 1 P; 198/27, 219, 488; 101/35, 38 R, 38 A, 39, 40, 126

[56] References Cited

U.S. PATENT DOCUMENTS

| 2,043,556 | 6/1936 | Protin | 214/1 PB UX |
|---|---|---|---|
| 2,525,305 | 10/1950 | Lombard | 214/1 P UX |
| 2,969,867 | 1/1961 | McClelland | 214/1 BD X |
| 3,286,626 | 11/1966 | Nowak | 101/126 X |
| 3,533,353 | 10/1970 | Dubuit | 101/40 |
| 3,661,202 | 5/1972 | Buhayar et al. | 214/1 BV X |
| 3,795,324 | 3/1974 | Kiwalle | 214/1 BD |

Primary Examiner—Clifford D. Crowder
Attorney, Agent, or Firm—Staas & Halsey

[57] ABSTRACT

An article handling apparatus which operates in conjunction with a silk screen printer. The apparatus includes a support element defining an operation station for allowing articles to be placed thereon for printing by the silk screen printer, a cradle for picking an article from a supply location and placing same at the operation station, a bumper attached to the cradle for discharging another article from the operation station prior to placing the picked article, and a crank/rocker drive mechanism for cyclically operating the cradle/bumper in an eccentric orbit for picking an article, discharging another article and placing the picked article, as well as returning the cradle/bumper to a starting position in a repetitious automatic cycle.

8 Claims, 9 Drawing Figures

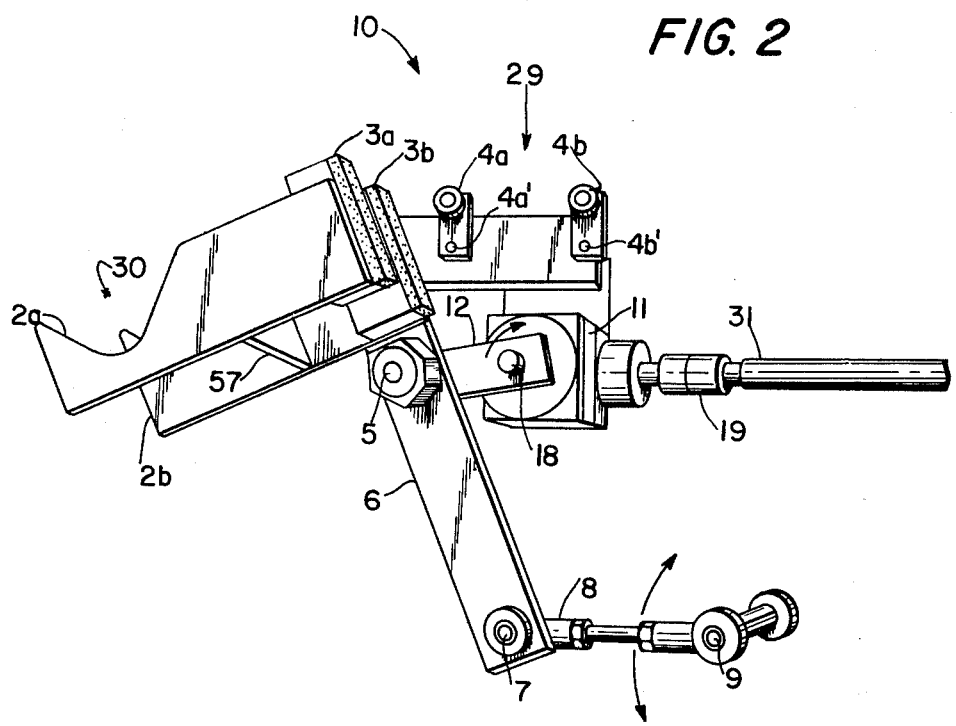
FIG. 2
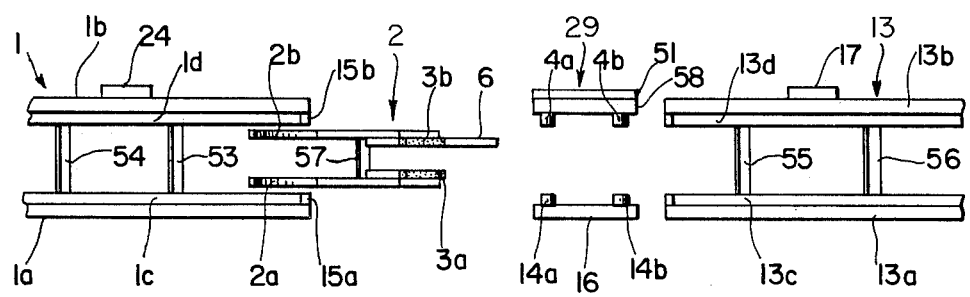
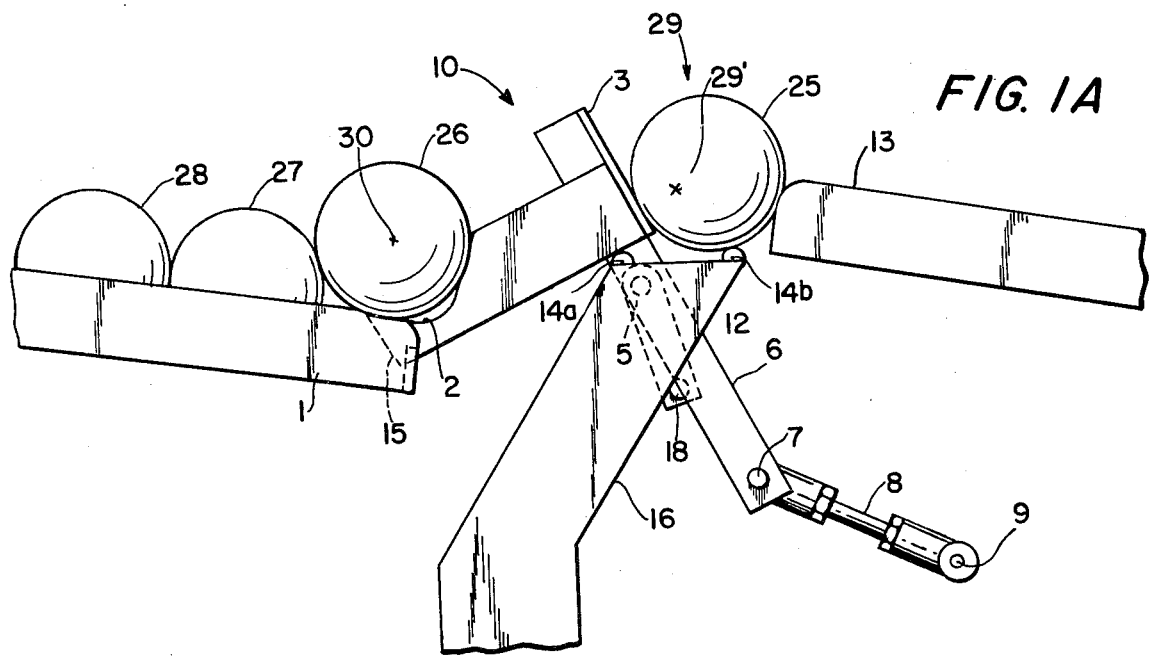
FIG. 1A
FIG. 3

APPARATUS FOR AUTOMATICALLY POSITIONING WITH RESPECT TO A PREDETERMINED OPERATION STATION

SUMMARY OF THE INVENTION

This invention relates to a fully automatic pick-discharge-place apparatus which transfers articles through a portion of an eccentric orbit controlled by a crank/rocker mechanism. A supply magazine provides articles which are to be operated on at an operation station. The apparatus of the present invention cycles to sequentially pick an article from the supply chute; discharge any previously placed article from the operation station; place the picked article on the operation station; move away from the placed article, allowing operations to be performed on the placed article; and return to a position for beginning the next cycle. The operation of the apparatus is synchronized with operations performed on the article at the operation station so that the operations are completed before the apparatus acts to discharge the article from the operation station. The sequence of events is best described with reference to a plurality of articles.

1. The first cycle begins and a first article is picked by the apparatus from the supply chute.
2. The first article is placed at the operation station.
3. An operation is performed on the first article at the operation station, while the apparatus completes its cycle and returns to a position for beginning the next cycle.
4. The operation is completed on the first selected article at the operating station.
5. The second cycle begins, a second article is picked by the apparatus from the supply chute and the first article at the operation station is discharged therefrom.
6. The second article is placed at the operation station, et. seq.

BRIEF DESCRIPTION OF THE DRAWINGS

FIG. 1A is a top view of a portion of the embodiment of the present invention as shown in FIG. 1.

FIG. 2 is a view of an embodiment of the present invention showing the mechanical drive mechanism.

FIGS. 3, 4, 5, 6 and 7 show sequential stages of the operation of the operating mechanism of the embodiment of the present invention shown in FIG. 2.

DETAILED DESCRIPTION OF THE PREFERRED EMBODIMENT

Figure 1:
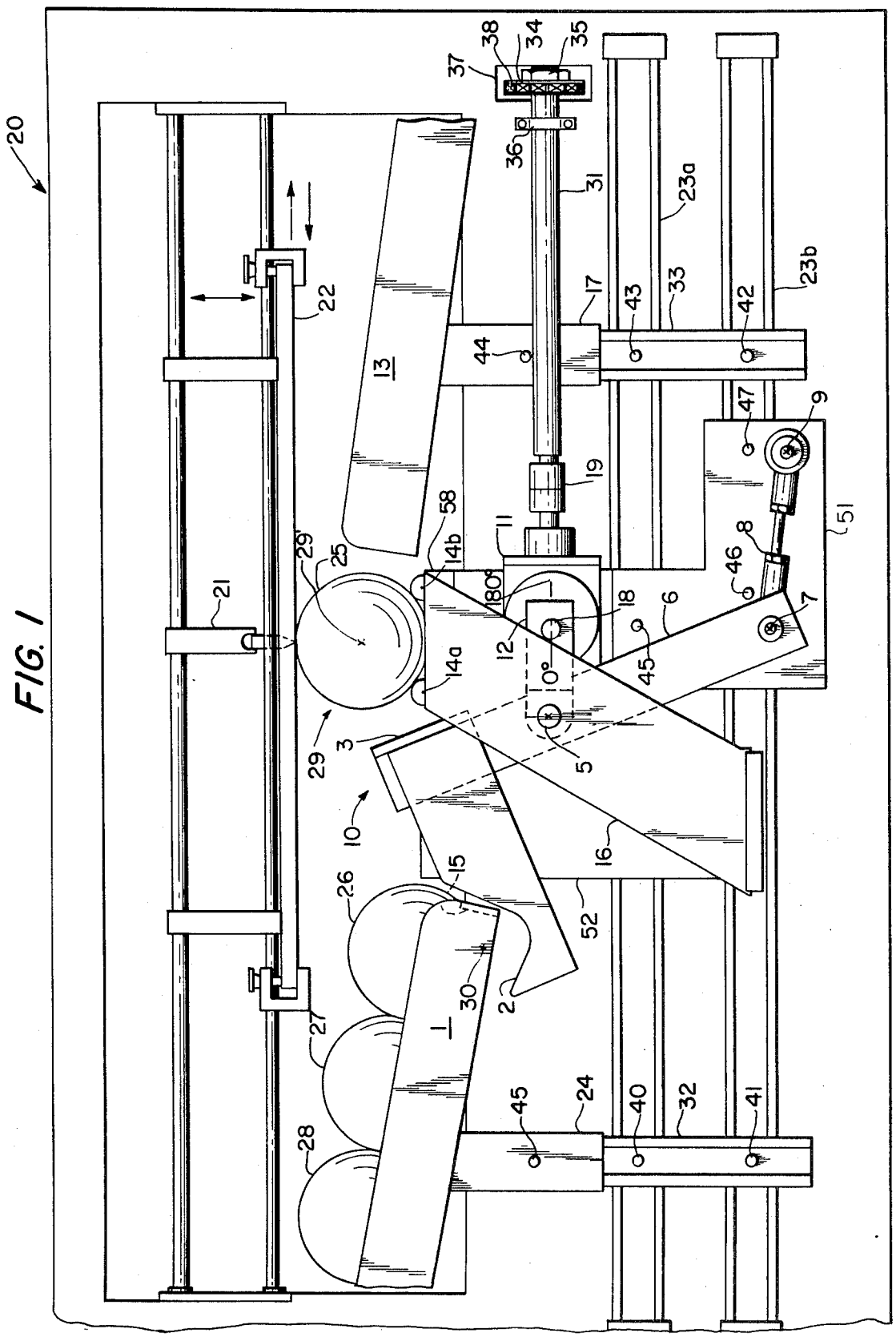
FIG. 1 is a side elevational view of an embodiment of the present invention shown in association with a silk screen printing apparatus.

FIG. 1 shows the pick-discharge-place apparatus 10, of the present invention employed in the handling of articles such as cylindrically shaped oil filter canisters on which a silk screen printer apparatus 20 operates to print indicia or other printed matter. The printing apparatus 20 also provides support for the elements of the apparatus 10, as well as a power take-off through outlet 37. A chain 38 extends through the outlet 37 and drives sprocket 34, which is connected to drive shaft 31 by locking nut 35. The drive shaft 31 is supported by bearing 36 on the printing apparatus 20, and connected by coupling 19 to the gear means 11. The support of the apparatus 10 is achieved by the use of horizontal channels 23a and 23b on the front of the printing apparatus 20. Many of the various fixed elements of the apparatus 10, described below, are secured to the horizontal channels 23a and 23b to insure stability between the apparatus 10 and the printing apparatus 20.

The printing apparatus 20 is of the type described in U.S. Pat. No. 3,545,377 and U.S. Pat. No. 3,838,639, wherein the squeegee 21 (FIG. 1 herein) and the silk screen 22 are simultaneously raised during a print dwell period.

In the present invention, with concurrent reference to FIGS. 1, 1A and 2-7, a cylindrical article is deposited at an operation station generally indicated as 29 and defined by rollers 4a, 4b, 14a and 14b. The center of the operation station 29' corresponds to the center of the article placed at the operation station 29. The squeegee and the silk screen 22 are lowered to make contact with the placed article during a print period. The silk screen 22 is then caused to travel in a horizontal direction while the squeegee 21 is maintained in a stationery position to print the pattern of the screen onto the placed article. The horizontal motion and pressure of the silk screen frame on the article causes the article to rotate on the rollers 4a, 4b, 14a and 14b, thereby effecting transfer of indicia from the silk screen 22 over a desired portion of the circumference of the article. However, if an article is employed which cannot be rotated by the motion of this silk screen, the printing apparatus 20 may be modified to cause the squeegee to move horizontally relative to the stationery silk screen and article.

In the embodiment of the present invention, the necessary discharge of printed articles from the operation station 29 and the subsequent placing of unprinted articles at the operation station 29 are performed during the print dwell period of the printing apparatus 20. Therefore, it is necessary that the cycle of the apparatus 10 be synchronized with the cycle of the printing apparatus 20. In the preferred embodiment, the print dwell period of one complete printing cycle corresponds to approximately 180° revolution of the crank lever 12, by rotation of the drive shaft 18 extending from gear means 11.

Gravity feed magazine 1 with stop 15 is designed to hold a supply of articles, such as oil filter canisters, and allow the articles to advance in series along the magazine, as each article resting against stop 15 is successively picked by the cradle 2. The gravity feed magazine 1 is connected to a vertically adjustable bracket 24, which is slidably mounted on a vertical channel 32 by a bolt 45, allowing for the supply and transfer of articles which may be of different size than those presently shown. The vertical channel 32 is secured by the horizontal channels 23a and 23b by respective bolts 40 and 41.

The gravity feed magazine 1 has side panels 1a and 1b and track elements 1c and 1d structurally connected together by brackets 53 and 54. The width of the magazine 1 is predetermined to accomodate an article of corresponding size. An alternative embodiment may show the width to be adjustable for rapid set-up in modifying the apparatus for articles of another size. Where the articles are canisters, they roll down the tracks 1c and 1d until they reach stop 15, comprising stop elements 15a and 15b.

The width of the magazine 1 is sufficient to allow the cradle 2 to pass through and pick an article resting against stop elements 15a and 15b. The cradle 2 is shown as shaped to receive the article in a smooth manner to eliminate transverse movement of the article, which may cause misalignment when placed at the operation station 29. The cradle 2 is made up of cradle elements 2a and 2b which are structurally joined by a bracket 57. The cradle 2 is rigidly connected to one end of an elongated cradle arm 6. The cradle arm 6 acts as a mechanical link and is pivotally connected at the other end to a rocker arm 8 at a pivot point 7, a predetermined distance from the cradle 2. The rocker arm 8 is pivotally connected to a mounting bracket 51 to rotate about an axis at fixed pivot point 9. The mounting bracket is secured to the horizontal channels 23a and 23b by bolts 45, 46 and 47. The cradle arm 6 is also pivotally connected at a intermediate pivot point 5 to a crank lever 12. Crank lever 12 is driven rotationally by drive shaft 18, serially connected to gearing means 11, coupling 19, drive shaft 31, sprocket 34 and chain 38. Therefore, the motion of the crank lever 12 causes the intermediate pivot point 5 on cradle arm 6 to translate in a circular path about the center of the drive shaft 18, while pivot point 7 on cradle arm 6 moves in an oscillatory fashion along an arc sector path centered at fixed pivot point 9. The cradle 2, specifically the cradle center 30, is caused to move along a predetermined eccentric orbit which passes between the tracks 1c and 1d of the gravity feed magazine 1 and the corresponding elements of the operation station 29. Rocker arm 8 is adjustable to different lengths to accomodate articles which are larger or smaller than those presently shown and to change the shape of the orbit.

Station support 16 is supported by bracket 52 which is connected to channels 23a and 23b. The station support 16 contains rollers 14a and 14b which are respectively aligned with rear rollers 4a and 4b. Rollers 4a and 4b are mounted on a block 58 for rotation of the article placed thereon. The block 58 is secured to mounting bracket 51. The four rollers define the operation station 29 at which the articles are placed. Although rollers 4 and 14 are shown in fixed position, it is understood that they may be made adjustable to accomodate different size articles with respect to the silk screen 22 by rotation about pins such as those shown in FIG. 2 as 4a' and 4b'. The cradle 2 also contains a bumper 3 containing bumping surfaces 3a and 3b, which travel with the cradle 2 in advance of the unprinted article being picked from the gravity feed magazine 1 for discharging a printed article from the operation station 29 to a discharge track 13. Discharge track 13 is aligned with the cradle 2 and the operation station 29 to receive the discharged articles. Vertically adjustable bracket 17 secures the discharge track 13 to a vertical channel 33 via bolt 44 for the purpose of setting the height and angle of the discharge track 13. The discharge track 13 contains rails 13c and 13d on which the extreme, upper and lower circumferential surface of the discharged article rests, when discharged from the operation station, for allowing the article to be transferred to a drying oven or the like without contacting the freshly painted surface. The rails 13c and 13d are respectively integral with the side walls 13a and 13b and are structurally connected by brackets 55 and 56. As described with respect to the feed magazine 1, an alternative embodiment may show the width of the discharge track 13 to be adjustable to accomodate articles of a different size than those shown here.

Although FIG. 1 shows the silk screen 22 and the squeegee 21 in the lowered position, the following description of the operation cycle of the apparatus 10 sequenced in FIGS. 3, 4, 5 and 6 is performed with the silk screen 22 in the raised position (print dwell period).

The apparatus 10 passes through the first 180° of its cycle during the time the silk screen is raised to the dwell position, and returns to its starting position through the second 180° of its cycle, and thus completing its cycle, during the time the silk screen 22 is lowered to the print position. As shown in FIG. 1, the cradle 2 starts from a position below an unprinted article 26 resting against stop 15 in gravity feed magazine 1, and the crank lever 12 is in an approximately horizontal position. To start the cycle, crank lever 12 is rotated clockwise by drive shaft 18. Then, cradle 2 picks up the unprinted article 26 and the bumber 3 of the cradle 2 approaches printed article 25 resting at operation station 29. An alternative embodiment may provide for the unprinted article being picked up subsequent to the discharge of the printed article, by modifying the dimension of the cradle 2 with respect to the bumping surfaces 3a and 3b of the bumper 3.

In FIG. 3, the cradle 2 is shown holding unprinted article 26, while bumping surfaces 3a and 3b of bumper 3 are shown contacting printed article 25 and pushing it from the operation station location towards the discharge track 13. The motion of the crank lever 12 necessarily causes the intermediate pivot point 5 of the cradle arm 6 to be raised in a corresponding circular arc with a radius defined by the distance between the center of the drive shaft 18 and pivot point 5. The pivot point 7 of the crank arm 6, by the motion of crank lever 12, moves in a circular arc sector about fixed pivot point 9, defined by the radial distance between pivot points 7 and 9. As shown, the distance between pivot point 5 and the center of drive shaft 18 is smaller than the distance between pivot points 7 and 9. Therefore, the cradle center 30, which corresponds to the center of the unprinted article 26 held by the cradle 2, transverses an orbit which is eccentric.

Figure 4:
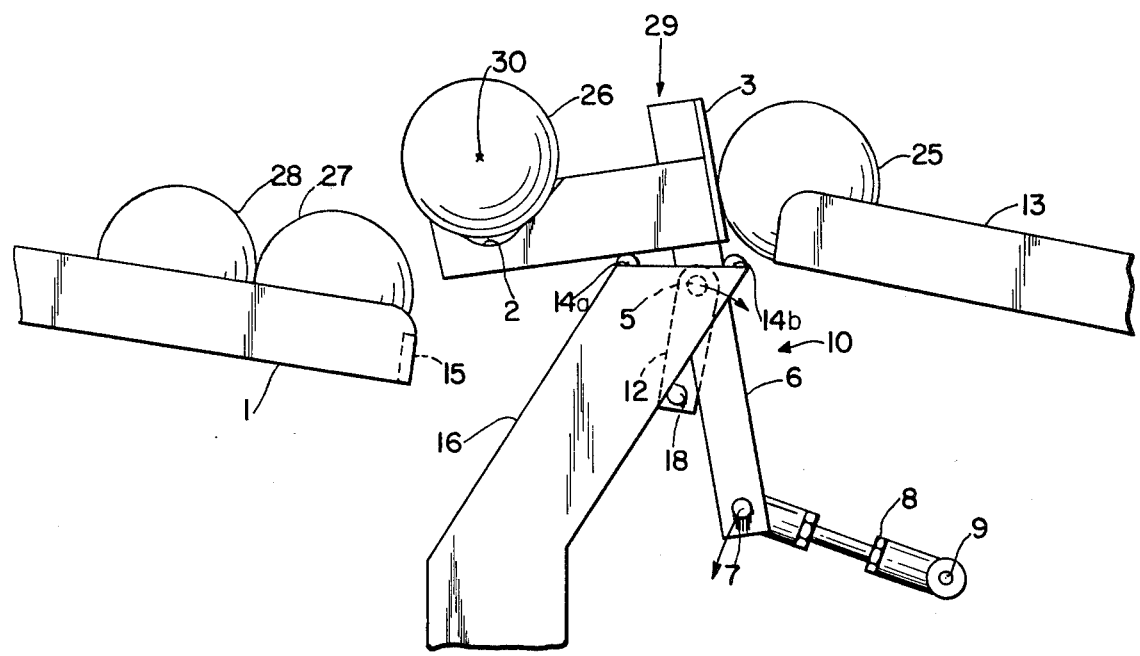

FIG. 4 shows the further advanced rotational motion of crank lever 12 causing bumper plates 3 to continue the discharge of the printed article 25 from the operation station 29. At this point, unprinted article 26 held by cradle 2 has moved sufficiently to allow other unprinted articles 27, 28, etc. to advance down the gravity feed magazine 1, thereby placing unprinted article 27 in position to be picked up during the next cycle of the apparatus 10.

Figure 5:
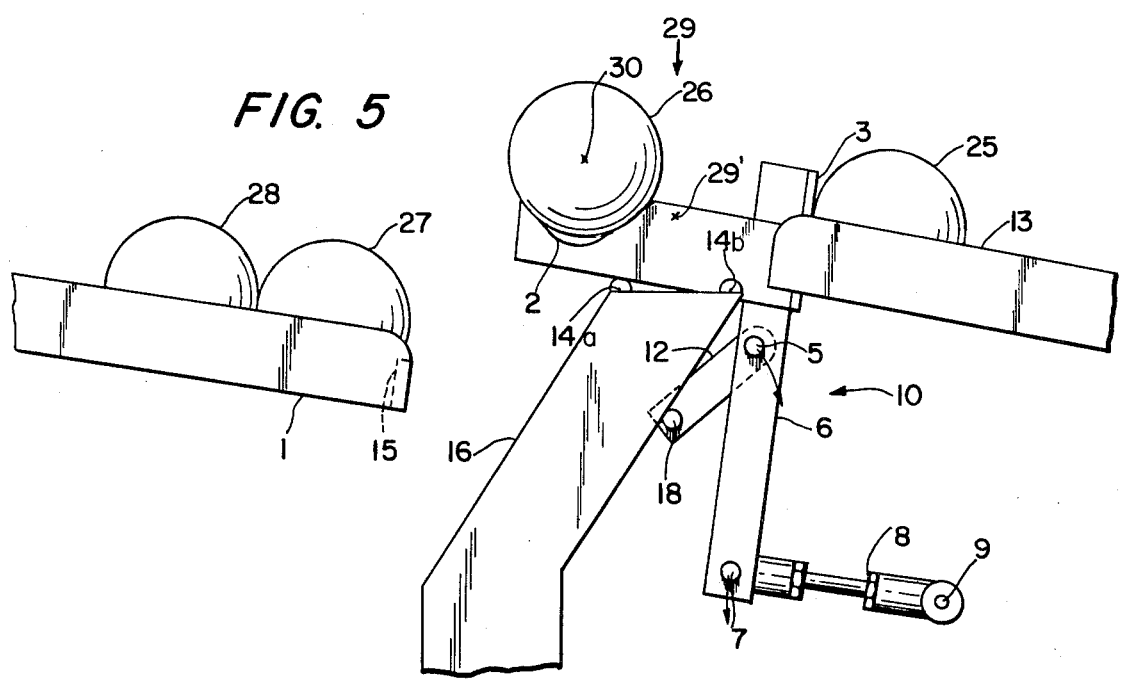

FIG. 5 shows the crank lever 12 beginning its downward rotation, with the cradle center 30 having just passed its highest vertical position and beginning its downward motion in an eccentric orbit towards the operation station 29.

Figure 6:
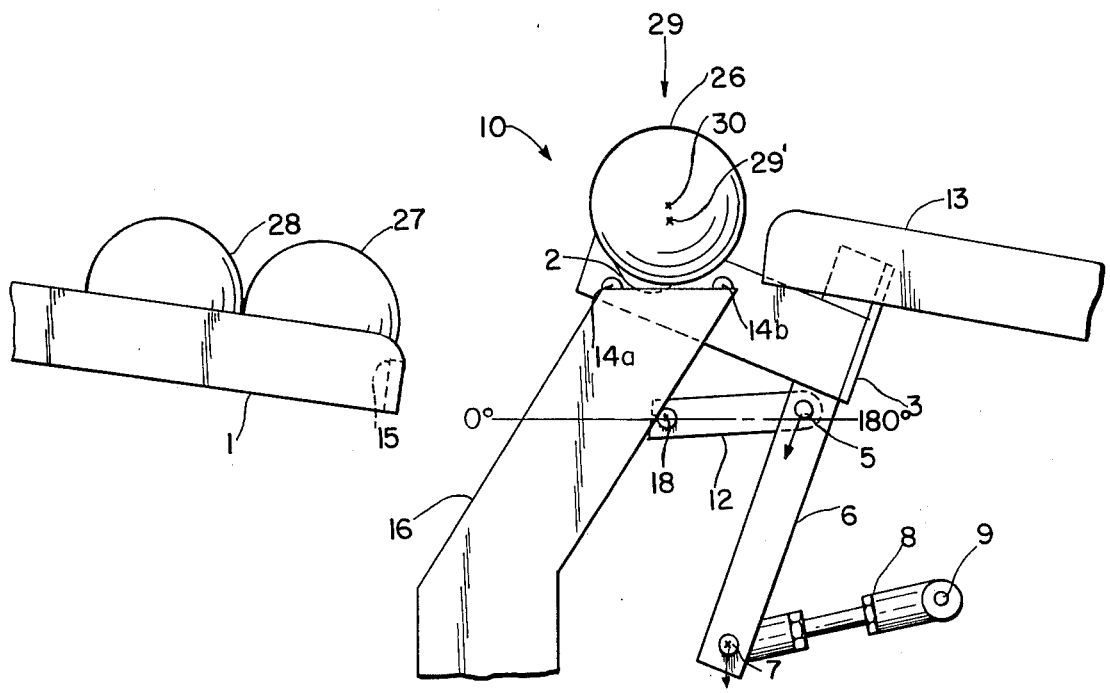

FIG. 6 shows the rotation crank lever 12 approaching a horizontal reference indicated as 0° - 180° through the center of drive shaft 18, while the cradle center 30 approaches the center of the operation station 29', immediately prior to placing the unprinted article on the operation station and completing the pick-discharge-place portion of the cycle.

Figure 7:
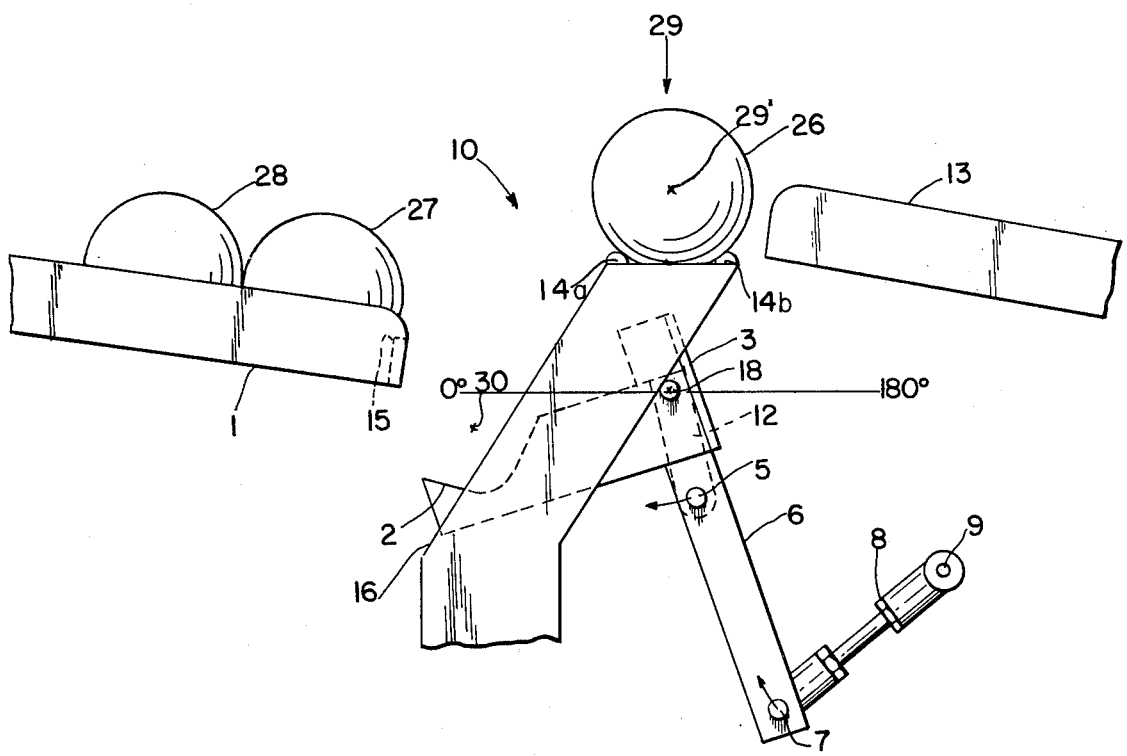

FIG. 7 shows the position of crank lever 12 after further clockwise rotation below the horizontal reference 0° - 180°, and thus through the return portion of the cycle of the apparatus 10 back to the start position. This return occurs during the period of time when the printing apparatus 20 is printing the placed article 26. The apparatus 10 may be timed to stop for a dwell period at the end of the return portion of the cycle to allow operations to be completed on the placed article, or it may be timed for continuous cyclical operation if operations on the placed artical can be completed during the return portion of the cycle.

Figure 8:
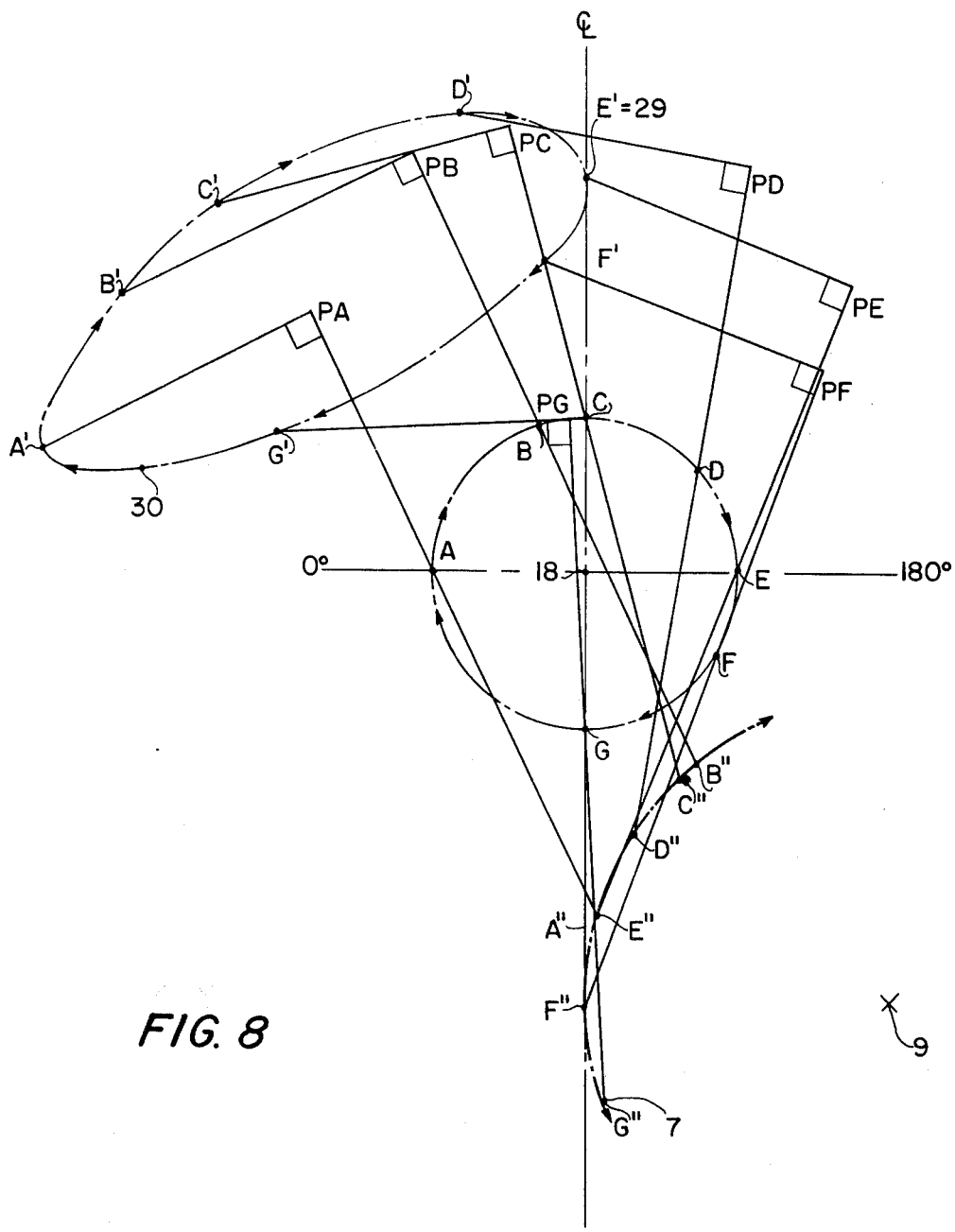
FIG. 8 is a geometric diagram showing the orbital motion of the linking elements employed in the drive mechanism of the embodiment of the invention.

FIG. 8 is a geometric diagram showing the locus of various points in the mechanism during a cycle of the apparatus 10 as illustrated in FIGS. 1 through 7. Various points A–G are shown, which correspond to the instantaneous locations of intermediate pivot point 5 following a circular motion about a drive axis 18' defined as the center of drive shaft 18. Similarly, points A" through G" correspond to the locus of points defined by the oscillatory motion of pivot point 7 in an arc sector about fixed pivot axis 9. The resulting motion of cradle center 30 is shown as an eccentric orbit plotted by points A' through G'. The locus of points A' through E' also indicate the motion of the center of an unprinted article as it is picked up at point A' and placed at the operation station 29 at point E'; while points A through E indicate the corresponding position of pivot point 5 of cradle arm 6 as pivot point 5 travels through a circular arc of approximately 180°. The lines joining corresponding points A, A'; B, B"; etc. represent the mechanical link of cradle arm 6 from pivot point 5 to pivot point 7. The lines joining corresponding points A, A'; B, B'; etc. through a 90° angle at corresponding points PA; PB; etc. represent the mechanical link from intermediate pivot point 5 to bumper 3 and the distance from the bumper 3 to the cradle center 30.

An advantage of the present invention is seen by referring to FIGS. 6, 7 and 8, in that the eccentric orbit of the cradle 2 causes the latter to move immediately and rapidly away from the article after it is placed at the operation station 29 thereby permitting operations at the station to proceed immediately. Efficiency of the apparatus 10 is also apparent, since an unprinted article is picked from a gravity feed magazine and substantially simultaneously a printed article is discharged down a gravity discharge track, and the picked article is placed at the operation station by the smooth, continuous motion of the cradle 2 in less than 180° of the operation cycle, and thus of the rotation of the crank lever 12.

It is noted that while the present invention is shown to be associated with a silk screen printer, operations other than the transfer of indicia may be made on articles at the operation station 29. Operations such as forming, stamping, labeling, inspecting, filling, drying, etc. may be performed on an individual article.

Although the disclosed embodiment employs a drive shaft 30 connected to the operating mechanism of a printing apparatus 20 to maintain synchronization while conveniently also supplying drive power, an alternative embodiment could be employed wherein crank lever 12 is driven by a separate power source maintained in synchronization with the operation of the printing apparatus 20.

Further, although the embodiment of the present invention is disclosed for handling cylindrically shaped articles such as oil filter canisters, the present invention may be adapted to accept articles of any predetermined shape which can be individually transferred to the operation station 29.

It will be apparent that many modifications and variations may be effected without departing from the scope of the novel concept of this invention. Therefore, it is intended by the appended claims to cover all such modification and variations which fall within the true spirit and scope of the invention.

I claim:

1. An apparatus for transferring articles from a first location to a second location comprising:
   a support base;
   a crank mounted for rotation about a first axis;
   means connected to said support base and said crank for driving said crank in rotation about said first axis;
   an elongated cradle arm pivotally connected at an intermediate point thereon to said crank at a first pivot point located a first predetermined distance from said first axis;
   a rocker arm having two ends, one end being pivotally connected to a first end of said cradle arm at a second pivot point located a second predetermined distance from said first pivot point and another end of said rocker arm being connected to said support base for pivoting about a fixed second axis;
   cradle means connected to a second end of said cradle arm for picking an article from said first location and placing said picked article at said second location;
   means for performing a predetermined operation on said article at said second location;
   means connected to said second end of said cradle arm adjacent said cradle for pushing said article substantially sidewise from said second location;
   said drive means rotating said crank means to cause said first pivot point at said intermediate point of said cradle arm to move in a circular path and said second pivot point at said first end of cradle arm to oscillate about said fixed second axis, whereby said cradle moves along an orbital path passing through said first location to pick an article therefrom, transferring the article for placement at said second location, subsequently to said pushing means pushing an article previously placed at said second location from said second location and moving away from said placed article as said cradle returns toward said first location and said operation means performs said predetermined operation, feed supply means for supplying said article at said first position, discharge track means for providing a path for said placed article pushed from said second location, and said discharge track means being arranged directly adjacent and to one side of the second location so that the push means does not lift the article at all but merely pushes same sidewise to said discharge track means.

2. Apparatus for transferring articles as in claim 1, wherein said articles are cylindrically shaped oil filter canisters.

3. Apparatus for transferring articles as in claim 1, wherein said second location is defined by a set of rollers, and said operation means is a silk screen printing apparatus for transferring indicia onto said placed article during the time said cradle means is returning toward said first location along said orbital path and further wherein said silk screen printing apparatus causes said placed article to rotate on said rollers as said indicia is being transferred thereto.

4. Apparatus as in claim 1, wherein said operation means is a silk screen printer for transferring indicia onto said placed article during the time said placed article is at said second location.

5. Apparatus as in claim 1, wherein said second location is defined by a set of rollers attached to said support base, allowing said placed article to freely rotate thereon.

6. Apparatus as in claim 5, wherein said operation means is a silk screen printer for transferring indicia onto said placed article during the time said placed article is at said second location, said silk screen printer including a silk screen means containing said indicia for contacting said placed article, means for translating said silk screen means and rotating said placed article on said rollers, and a squeegee for transferring said indicia on said silk screen means to said placed article during the translation of said silk screen.

7. Apparatus for transferring articles as in claim 5, wherein said articles are cylindrically shaped oil filter canisters.

8. Apparatus for transferring articles as in claim 7, wherein said rocker arm is an elongated member adjustable in length to adjust the shape of said orbital path.

* * * * *